United States Patent [19]

Radice

[11] 4,276,030
[45] Jun. 30, 1981

[54] PIVOTABLE VEHICLE SIMULATOR

[75] Inventor: John G. Radice, Binghamton, N.Y.

[73] Assignee: Doron Precision Systems, Inc., Binghamton, N.Y.

[21] Appl. No.: 89,948

[22] Filed: Oct. 31, 1979

[51] Int. Cl.³ .............................................. G09B 9/04
[52] U.S. Cl. ...................................... 434/62; 272/1 R
[58] Field of Search .................. 35/11 R, 11 A, 12 S, 35/12 P, 12 L; 273/1 GA, 1 GC; 272/16, 17, 18, 1 R

[56] References Cited

U.S. PATENT DOCUMENTS

| | | | |
|---|---|---|---|
| 2,447,203 | 8/1948 | O'Toole | 272/33 R |
| 2,463,602 | 3/1949 | Dehmel | 35/12 P |
| 2,533,368 | 12/1950 | Hansen et al. | 272/33 R |
| 3,479,750 | 11/1969 | Swanson | 35/11 R |

*Primary Examiner*—Richard C. Pinkham
*Assistant Examiner*—Scott L. Brown
*Attorney, Agent, or Firm*—Richard G. Stephens

[57] ABSTRACT

One end of an upper frame carrying an occupant station of a simulated vehicle is mounted on a base frame to pivot about a vertical axis, and a dummy steering wheel at the occupant station is linked to pivot the upper frame. Combined rotary and translation bearings support the other end of the upper frame on a shaft carried on the base frame to accommodate the pivotal movement about the vertical axis and also to provide a small upward pitching of the upper frame during pivoting of the upper frame in either direction from a central position, so that gravity acts to restore the upper frame and the steering wheel to centered conditions.

5 Claims, 6 Drawing Figures

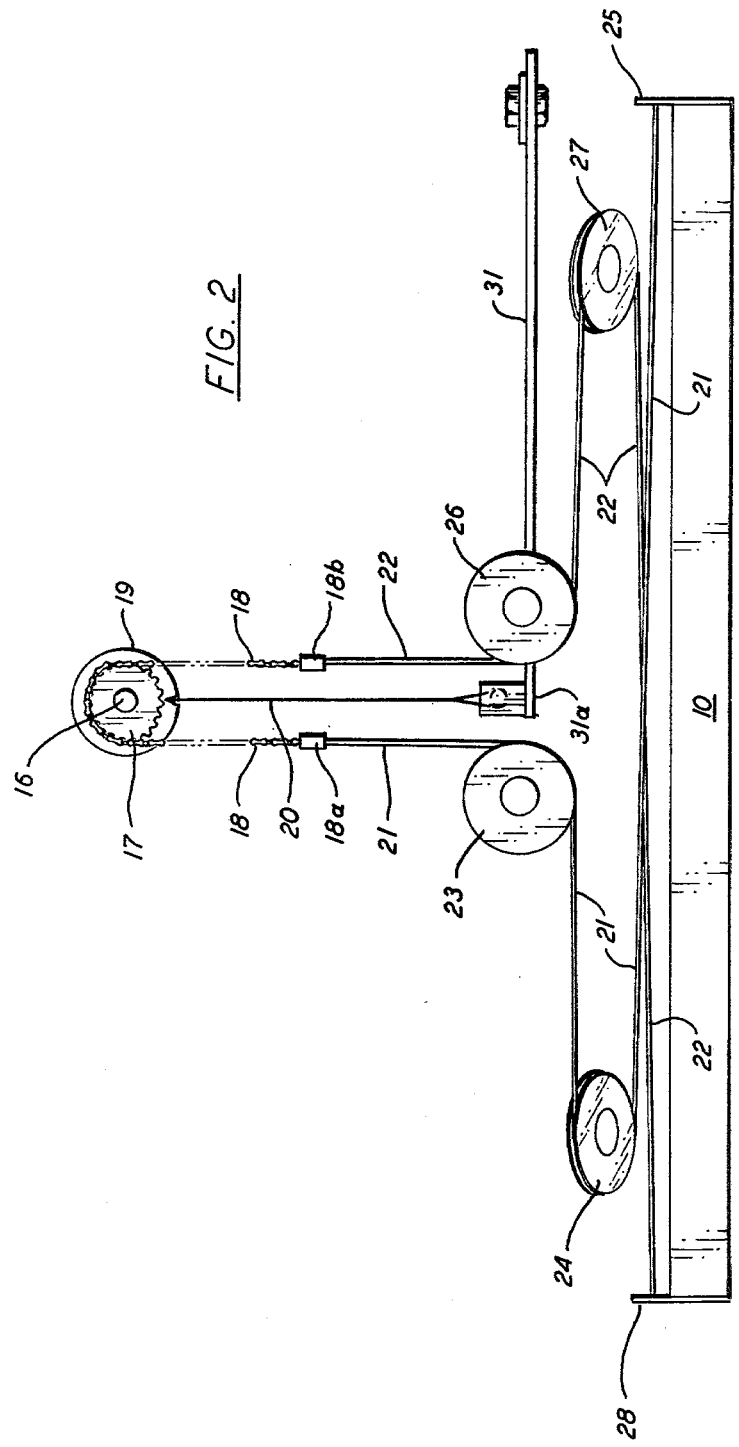

PIVOTABLE VEHICLE SIMULATOR

This invention relates to simulated vehicles, and more particularly to mechanism for providing occupant motion in simulated vehicles such as automobile or truck driver trainers, and simulated vehicles used for amusement purposes. Simulated vehicles in which students seated in dummy driver's seats operate dummy vehicle controls while observing a motion picture are widely used in secondary schools, and elsewhere, to provide driver training. Generally similar simulated vehicle apparatus is finding increasing use in amusement parks. In an educational environment the training effectiveness of such apparatus is believed to be enhanced, and in an amusement environment the attractiveness of such apparatus to paying customers is believed to be increased, by provision of added realism. The broad idea of providing occupant motion in vehicle training apparatus is very old. Because of the high cost and possible dangers of providing training in actual aircraft, it is common to provide occupant motion in modern flight simulators in all three angular and all three translational degrees of freedom, using very elaborate, extremely expensive apparatus, ordinarily providing computer-controlled servomechanisms to effect various student station motions. The great expense of such apparatus cannot be justified for automobile driver training in high schools, nor for amusement purposes. One general object of the present invention is to provide a simple and economical mechanism for imparting motion to a dummy driver station.

In accordance with one aspect of the present invention, added realism is effected in a simulated grounded vehicle device in a simple and economical manner by providing solely yawing or turning motions, and by arranging such motions to be powered solely by student effort, e.g. student operation of a steering wheel, making it unnecessary to provide any servo-mechanisms or other motor means. Thus one object of the present invention is to provide an improved occupant motion system operated solely by the occupant. A further general object of the invention is to provide an occupant motion mechanism which is wholly mechanical, so that it may be readily adjusted and serviced by persons having little or no understanding of electronics.

In a moving automotive vehicle, whether or not it incorporates power-assist steering, driver rotation of the steering wheel ordinarilly does not encounter discernible backlash or static friction and the vehicle tends to apply re-centering forces to the steering wheel which are proportional to the amount of wheel rotation from a centered position. It is important for sake of realism, particularly in a training environment, that a simulated vehicle steering wheel similarly have no discernible backlash or static friction, and that it have realistic re-centering torque applied to it. A further and very important object of the invention is to provide an improved jaw motion mechanism having both very little bachlash and very little static friction, and also very little kinetic friction. Another related object of the invention is to provide an improved yaw motion mechanism which is self-centering.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 2 is a diagrammatic elevation view taken generally at lines 2—2 in FIG. 1 illustrating one form of pulley-cable connection useful with the present invention.

Figure 1:
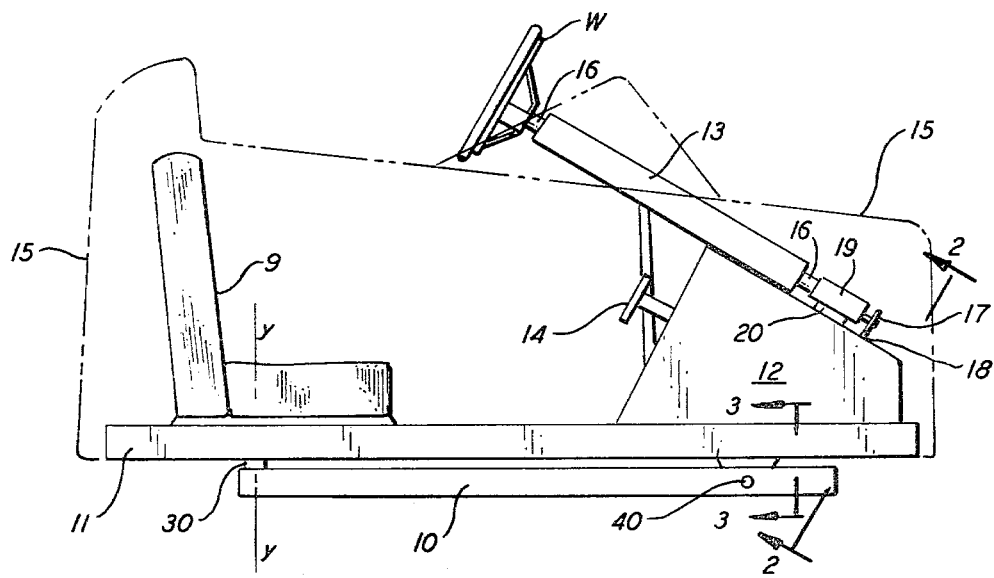
FIG. 1 is a diagrammatic side view of one form of driver trainer incorporating the invention, with numerous parts not relevant to the present invention omitted.

Referring to FIG. 1, the driver station is shown including a base frame 10 adapted to sit atop a floor in a wholly stationary manner, and an upper frame 11, which is pivotally mounted atop base frame 10 in a manner to be described in detail. A seat 9 accommodates a student. A housing 12 fixedly mounted to upper frame 11 carries a dummy steering column 13 and surrounds various devices such as dummy brake control 14 which are not particularly pertinent to the present invention. A Fiberglas housing 15 shown in dashed lines carries various dummy instruments and controls, and seat 12 may be affixed thereto. The upper frame 11 is shown pivotally mounted by a pivot bearing means 30 near the rear end of base frame 10 for yawing or pivotal movement of frame 11 relative to base frame 10 generally about a substantially vertical axis y—y, and as will be shown below, such pivotal movement is effected by the student's rotation of a dummy steering wheel W. In one successful embodiment of the invention pivotal movement of approximately 7 to 8 degrees in either direction from a centered position was deemed adequate. A transversely-extending shaft 40 is affixed to base frame 10, and novel means to be described support the forward end of frame 11 on shaft 40, as pivotal movement occurs about axis y—y. As will become clear below, the forward end of frame 11 raises and lowers or pitches very slightly relative to base frame 10 as the yawing movement occurs, and frame 11 rolls or tilts very slightly as yawing occurs. The pitching and rolling movements of frame 11 are so small as not to be discernible by the station occupant. In typical embodiments of the invention, the pitching and rolling movements are so small that the design of rear pivot bearing 30 may wholly ignore the pitching and rolling movements, with minor amounts of flexing occurring in members of frames 10 and 11 so that no play need be provided in rear bearing 30, which may comprise a simple vertical shaft and a surrounding roller bearing.

Steering column 13 comprises a hollow tube having bearings (not shown) to rotatably support steering shaft 16, which extends upwardly at an angle of about 30 degrees from the horizontal. The upper end of shaft 16 carries steering wheel W. The lower end of steering shaft 16 carries a sprocket 17 engaging a length of chain 18, and carries a cylindrical clamp 19 which clamps one end of a fabric band 20 to shaft 16. Chain length 18 and band 20 extend within housing 12 through an opening provided in the top of the housing.

Figure 2A:
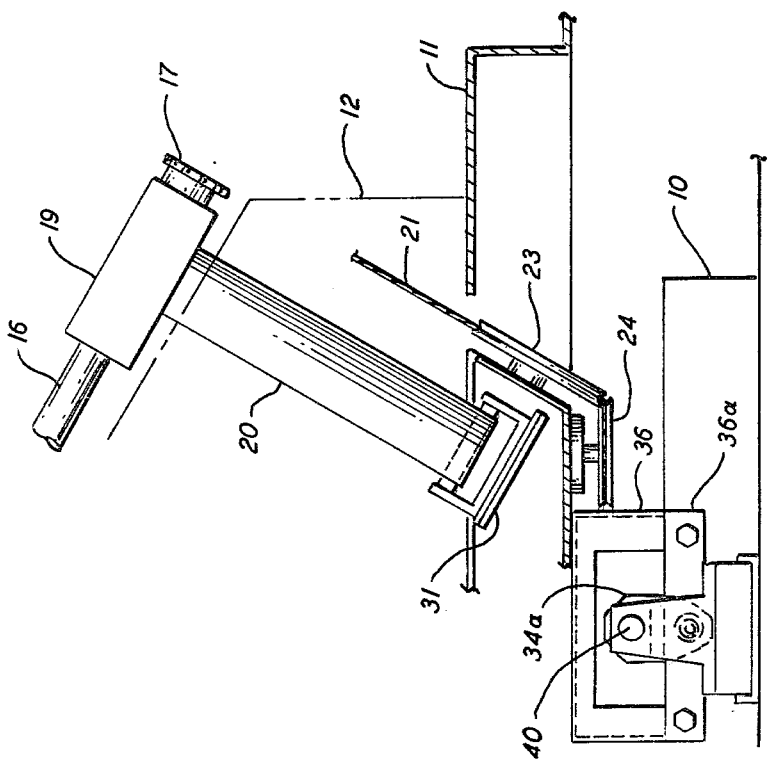
FIG. 2a is a side elevation view further illustrating apparatus shown in FIGS. 2 and 3.

As shown in FIG. 2, the ends of 18a, 18b of chain 18 are connected to wire cables 21,22. Cable 21 extends from end 18a of the chain around pulley 23, which is journalled (as shown in FIG. 2a) to rotate about an axis substantially parallel to that of shaft 16, thence leftwardly as viewed in FIG. 2 to pulley 24, which is journalled on frame 11 as shown in FIG. 2a to rotate about a substantially vertical axis, around pulley 24 and rightwardly across the simulated vehicle to tie to base frame 10 at 25. In a similar mirror-image fashion, cable 22 extends from end 18b of the chain around pulley 26, which is journalled to rotate about an axis substantially parallel to those of shaft 16 and pulley 23, thence rightwardly as viewed in FIG. 2 to pulley 27, around pulley 27 and leftwardly across the simulated vehicle to tie to base frame 10 at 28. With pulleys 23,24,26 and 27 fixedly journalled on upper frame 11 and the ends of cables 21 and 22 ties to base frame 10, it will become apparent that rotation of wheel W and shaft 16 will move the forward end of frame 11 rightwardly or leftwardly. It is necessary, of course, that the forward end of frame 11 swing in the direction in which wheel W is turned. As viewed in FIG. 2, if shaft 16 and sprocket 17 are turned clockwise, for example, it will be seen that chain 18 will apply tension to cable 21 and pay out chain to cable 22, and the tension in cable 21 will urge pulley 24 toward the point 25 on base frame 10, moving the forward end of frame 11 in the desired direction. The opposite motion occurring when steering shaft is rotated counter-clockwise will be apparent due to the symmetry of the apparatus. The pulleys 23,24,26,27 carried on upper frame 11 each preferably comprises a ball-bearing pulley, such as the type commonly used for aircraft control cables, in order to provide minimum friction.

As shown in FIG. 2, fabric band 20 extends from cylindrical clamping sleeve 19 on shaft 16 to have its other end affixed to the free end 31a of a cantilever leaf spring 31, one end of which is affixed to frame 11. When wheel W is in the centered position shown, spring 31 has a minimum deflection and applies a minimum but finite tension to band 20, and because the tension in band 20 is directed through the axis of shaft 16, it tends to hold the steering wheel in that centered position. However, as steering wheel W rotates steering shaft 16 from the centered position shown, increasing upper portions of band 20 will be wrapped around cylindrical sleeve 19 and end 31a of spring 31 will be pulled upwardly, increasing the force of spring 31 and the tension in band 20. If after being turned from the centered position the steering wheel is released, it will be apparent that the force of spring 31 will tend to unroll band 20 from cylindrical sleeve 19, tending to restore shaft 16 and sleeve 19 to the centered position.

One should note, however, that when one has turned wheel W appreciably from a centered position, one will have appreciably yawed upper frame 11, which carries the student and represents a considerable mass. Restoring wheel W to the centered position then will require repositioning that means to its centered position, and overcoming mechanism friction while doing so. Potentially that might require that spring 31 be capable of exerting a very great force and that band 20 be capable of withstanding great tension. In accordance with another feature of the invention such potential problems are obviated by arranging the yawing mechanism so that gravity tends to provide a substantial restoring or re-centering torque to the steering shaft.

Figure 3:
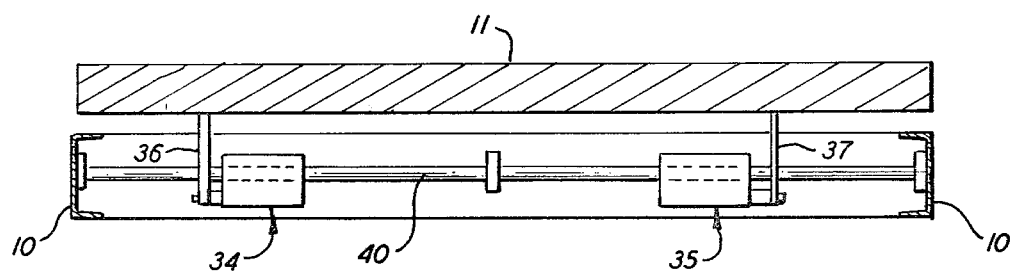
FIG. 3 is a diagrammatic view taken at lines 3—3 in FIG. 1.
Figure 3A:
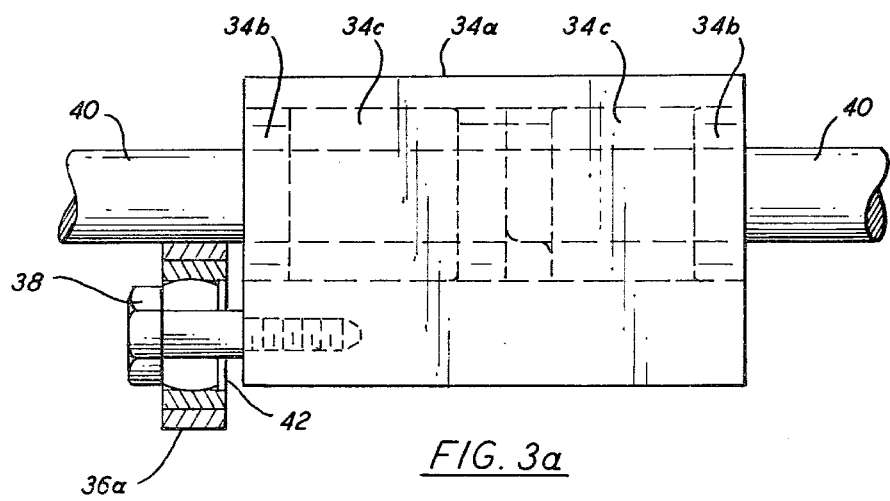
FIG. 3a is an enlarged view of one form of bearing assembly used in the present invention.

Referring to FIG. 3, the straight transverse shaft 40 is shown extending across base frame 10 and carrying two bearing assemblies 34 and 35. The pivotable upper frame 11 is shown attached to bearing assemblies 34 and 35 by means of brackets 36 and 37. Assembly 34 is shown in FIG. 3a as comprising a block 34a having a through bore in which both rotary and linear motion bearings are fitted to support the bearing block for both rotary movement partway around shaft 40 and translational movement partway along shaft 40. In FIG. 3a rotary or radial load bearings shown diagrammatically at 34b, 34b may comprise for example, Type A-122026 linear or translational ball bushings, and radial-load bearings shown diagrammatically at 34c, 34c may comprise Type CMB-750 combination bearing sets, both of which Types of bearings are commercially available from Thomson Industries, Inc., Manhasset, New York. Spherical bearing 42 carried in bar 36a of bracket 36 interconnects upper frame 11 and bearing block 34a, being affixed to the latter by means of bolt 38.

Bearing assembly 35 may be similar to assembly 34, and it is attached to bracket 37 via a spherical bearing in similar fashion.

Figure 4:
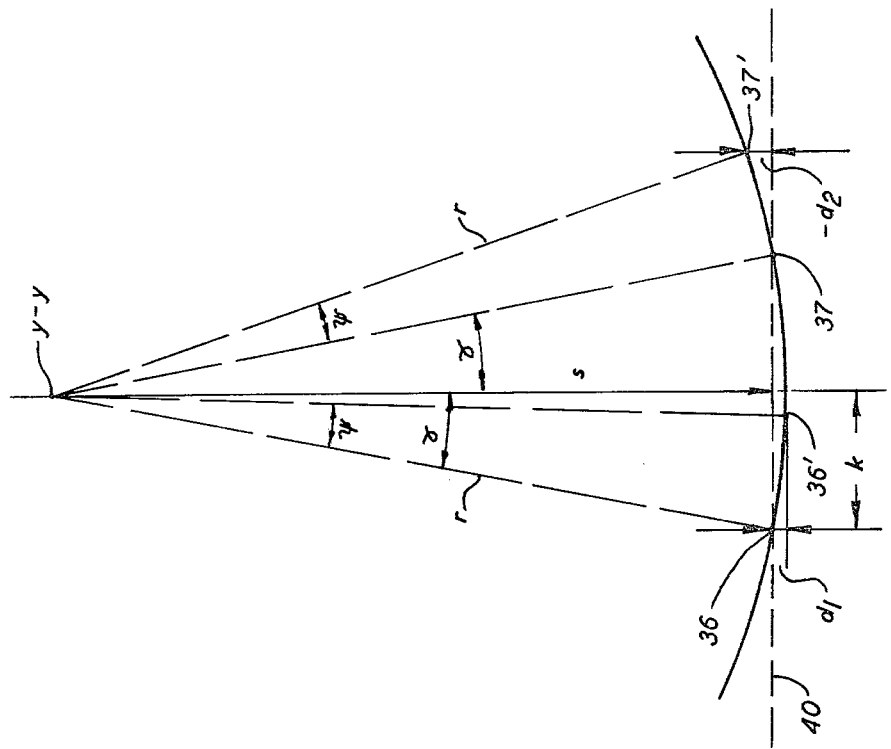
FIG. 4 is a plan view geometric diagram useful in understanding operation of the invention.

As turning of the steering wheel causes the upper frame 11 to pivot about axis y—y, support brackets 36 and 37 attached to the upper frame can be understood to move along arcuate paths having arc centers at axis y—y, slightly varying the distances (measured normal to the plane of FIG. 3) between brackets 36,37 and shaft 40. Thus it can be seen that as the forward end of upper frame 11 shown in FIG. 3 is moved leftwardly or rightwardly relative to base frame 10 from the centered position shown in FIG. 3, bearing assemblies 34 and 35 will not only slide along shaft 40, but will also rotate slightly around shaft 40. Because the spherical bearings attach support brackets 36 and 37 to bearing block members 34a, 35a at a radius arm distance from the axis of shaft 40, it can be seen that rotation of bearing assemblies 34 and 35 around shaft 40 tends to slightly raise brackets 36,37 from lowermost positions and hence to raise and lower slightly the forward end of frame 11. Referring to FIG. 4, it can be seen that if points on brackets 36 and 37 are equidistant from or both centered over shaft 40 when upper frame 11 is not yawed, that upon yawing upper frame 11 in one direction, so as to move the points on the brackets to points 36' and 37', for example, bracket 36 moves forwardly distance $d_1$ relative to shaft 40, while bracket 37 moves rearwardly distance $d_2$ relative to shaft 40. Furthermore, it is apparent that distance $d_2$ exceeds distance $d_1$, and hence for yawing motion in the direction assumed, bearing assembly 35 will be rotated about shaft 40 somewhat more than assembly 34, raising one side of frame 11 very slightly more than the other side. Thus in addition to the appreciable yawing motion accomplished with the steering wheel is turned from the centered condition, the mechanism provides a very slight pitching motion and a very slight rolling motion. The pitching and rolling motions may be made so small, however, that they are not discernible to the occupant. In a typical embodiment of the invention if the dimension (s in FIG. 4) between rear pivot axis y—y and shaft 40 is 36 inches and support arms 36,37 are 12 inches apart, if the spherical bearings act at a radial distance of 1.3 inch from the axis of shaft 40, the raising and lowering of arms 36,37 occurs within a distance less than 0.3 inch, the upper frame 11 pitches less than 0.3 degree and rolls about 0.53 degree as frame 11 yaws 6 degrees in either direction.

Even though the pitching movement is extremely small, it tends to provide useful re-centering forces. Gravitational force will be seen to urge the front end of frame 11 downwardly until the spherical bearings reach their lowermost positions directly below shaft 40, and because those positions are attained only when frame 11 is re-centered over base frame 10, gravity acts to re-center frame 11, aiding the force of spring 31. The arrangement shown, with ball bearings provided in assemblies 34 and 35 to accommodate both linear translation along shaft 40 and radial loads applied to shaft 40, results in very low friction, so that the upper frame 11 readily centers itself atop base frame 10 when the steering wheel W is released.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed as defined as follows:

1. Simulated vehicle apparatus, comprising, in combination: a base frame; a first shaft fixedly supported on said base frame and extending substantially horizontally; a second frame carrying an occupant station including simulated steering wheel, and a steering shaft journalled on said second frame and connected to be rotated by said steering wheel; pivot bearing means interconnecting said base frame and said second frame for pivotal movement of said second frame relative to said base frame about a substantially vertical first axis; second bearing means carried on said first shaft for translation along said first shaft and rotation about said first shaft; spherical bearing means pivotally interconnecting said second frame and said second bearing means; and cable means connected between said steering shaft and said base frame and operable to pivot said second frame about said first axis.

2. Apparatus according to claim 1 wherein said second bearing means comprises first and second bearing block members spaced apart from each along said first shaft.

3. Apparatus according to claim 1 wherein said spherical bearing means interconnects said second frame to said second bearing means at a radial distance from said first shaft, whereby rotation of said second bearing means about said first shaft raises and lowers one end of said second frame.

4. Apparatus according to claim 1 having spring means mounted on said second frame; a cylinder connected to be rotated by said steering shaft; and a flexible band connected between said cylinder and said spring means, whereby rotation of said steering shaft winds portions of said band about said cylinder to deflect said spring means and said spring means applies a torque through said flexible band to said cylinder to urge said steering shaft to a predetermined angular position.

5. Simulated vehicle apparatus, comprising, in combination: a base frame; a second frame having mounted thereon an occupant station and a simulated steering control; first means interconnecting said simulated steering control and said second frame so that movement of said steering control away from a first predetermined position rotates said second frame relative to said base frame about a substantially vertical axis; and bearing means supporting said second frame on said base frame, said bearing means being operable to slightly raise a portion of said second frame by an amount proportional to said rotation of said second frame as said second frame rotates in either direction from a second predetermined position, whereby gravitational acceleration acting on said second frame tends to restore said second frame to said second predetermined position and said steering control to said first predetermined position.

* * * * *